(12) United States Patent
Mallard (10) Patent No.: US 10,935,066 B2
(45) Date of Patent: Mar. 2, 2021

(54) FASTENER ASSEMBLY

(71) Applicant: Ford Motor Company Limited, Brentwood (GB)

(72) Inventor: William John Mallard, Southend on Sea (GB)

(73) Assignee: Ford Motor Company Limited, Dearborn, MI (US)

(*) Notice: Subject to any disclaimer, the term of this patent is extended or adjusted under 35 U.S.C. 154(b) by 940 days.

(21) Appl. No.: 15/615,282

(22) Filed: Jun. 6, 2017

(65) Prior Publication Data
US 2017/0356484 A1    Dec. 14, 2017

(30) Foreign Application Priority Data

Jun. 8, 2016    (GB) .................................... 1609990.5

(51) Int. Cl.
*F16B 35/02*    (2006.01)
*F16B 31/04*    (2006.01)
(Continued)

(52) U.S. Cl.
CPC .............. *F16B 31/04* (2013.01); *B62D 27/06* (2013.01); *F16B 35/02* (2013.01); *F16B 1/02* (2013.01); *F16B 29/00* (2013.01)

(58) Field of Classification Search
CPC ...... F16B 21/20; F16B 21/065; F16B 21/075; F16B 21/186; F16B 35/02; F16B 35/041; F16B 5/0657; F16B 5/0664; F16B 5/0642
See application file for complete search history.

(56) References Cited

U.S. PATENT DOCUMENTS

| 5,997,541 A | 12/1999 | Schenk |
| 6,679,666 B2 | 1/2004 | Mizuno et al. |
| (Continued) | | |

FOREIGN PATENT DOCUMENTS

| CN | 102449325 A | 5/2012 |
| CN | 104819186 A | 8/2015 |
| (Continued) | | |

OTHER PUBLICATIONS

Intellectual Property Office of Great Britain, Combined Search and Examination Report Issued in Application No. GB1609990.5, dated Sep. 29, 2016, South Wales, 5 pages.
(Continued)

*Primary Examiner* — Daniel J Wiley
(74) *Attorney, Agent, or Firm* — Geoffrey Brumbaugh; McCoy Russell LLP (57) ABSTRACT

A fastener assembly for a motor vehicle is provided. The fastener assembly comprises a fastener configured to couple a first component to a second component of the motor vehicle, the fastener comprising a shank configured to be received within a bore of the first component; and a retaining member, the retaining member being couplable to the fastener and the first component, the retaining member comprising an opening configured to receive the fastener shank and to provide a resistance against the removal of the fastener shank from the bore of the first component, wherein the retaining member comprises a deformable portion configured to deform from a first state to a second state by virtue of the operating environment of the first component such that the fastener may be removed from the bore when the deformable portion is in the second state following operation of the motor vehicle.

21 Claims, 4 Drawing Sheets

(51) Int. Cl.
  *B62D 27/06* (2006.01)
  *F16B 1/02* (2006.01)
  *F16B 29/00* (2006.01)

(56) References Cited

U.S. PATENT DOCUMENTS

| | | |
|---|---|---|
| 7,789,605 B2 | 9/2010 | Kidman |
| 8,506,608 B2 | 8/2013 | Cerynik et al. |
| 2004/0042873 A1 | 3/2004 | Burmahln |
| 2013/0071205 A1* | 3/2013 | Kuehn .................. F16B 21/20 |
| | | 411/511 |

FOREIGN PATENT DOCUMENTS

| | | | |
|---|---|---|---|
| DE | 3310472 | A1 | 9/1984 |
| DE | 69608002 | T2 | 3/2004 |
| JP | 2001012435 | A | 1/2001 |

OTHER PUBLICATIONS

National Intellectual Property Administration of the People's Republic of China, Office Action and Search Report Issued in Application Serial No. 201710402710.0, dated Apr. 2, 2020, 11 pages. (Submitted with Partial Translation).

\* cited by examiner

FASTENER ASSEMBLY

RELATED APPLICATION

This application claims priority to Great Britain Patent Application No. 1609990.5, filed Jun. 8, 2016. The entire contents of the above-referenced application are hereby incorporated by reference in its entirety for all purposes.

TECHNICAL FIELD

The present disclosure relates to a fastener assembly and is particularly, although not exclusively, concerned with an engine assembly configured to allow a captive, single use fastener to be replaced during maintenance of the engine assembly.

BACKGROUND

A motor vehicle often comprises many different types of fasteners that are used for coupling together the components and subassemblies of the vehicle. The different fasteners used on the vehicle may have different diameters, lengths and/or grades, e.g. strengths. Locating the appropriate fasteners to use for assembling each component or subassembly onto the vehicle may be a time-consuming process.

In order to improve the efficiency with which the motor vehicle is assembled, it is often desirable to locate the appropriate fasteners for a particular component or subassembly prior to the stage in the assembly of the vehicle when the component or subassembly is installed onto the vehicle. In some cases the fasteners may be located and provided in bores of the component or subassembly on a subassembly line, e.g. away from a main vehicle production line, and may be transported to the main production line with the fasteners already in place. In this case, it is often desirable for the fasteners to be captive fasteners that are held within the bores of the component or subassembly and prevented from disengaging from the component or subassembly prior to installation on the vehicle.

Following manufacture of the vehicle, it is often desirable to disassemble components or subassemblies from the vehicle in order to perform service and maintenance procedures on the vehicle. During maintenance it may be desirable to replace one or more of the fasteners used to couple a component or subassembly to the vehicle. For example, it may be desirable to replace a single-use fastener that has been exposed to stresses equal to or greater than its yield stress during a previous assembly procedure. However, if the fastener is a captive fastener that cannot be removed from the bore of the component or subassembly, it may be necessary for the component or subassembly itself to be replaced in order to replace the fastener.

Furthermore, during some service and maintenance operations, it may be desirable to fully remove the fasteners from a component or subassembly in order to provide clearance for the component or subassembly to be removed from the vehicle, e.g. to replace the component. However, if the fasteners are captive within the component, it may not be possible to fully remove the fasteners and further disassembly of the vehicle may be required in order to replace the component or subassembly.

STATEMENTS OF INVENTION

According to an aspect of the present disclosure, there is provided a motor vehicle assembly comprising: a first component, a second component and a fastener assembly, the fastener assembly comprising: a fastener configured to couple the first component to the second component, the fastener comprising a shank configured to be received within a bore of the first component; and a retaining member, the retaining member being couplable to the fastener and the first component, the retaining member comprising an opening configured to receive the fastener shank and to provide a resistance against the removal of the fastener shank from the bore, wherein the retaining member comprises a deformable portion configured to deform from a first state to a second state by virtue of the first component operating environment such that the fastener may be removed from the bore when the deformable portion is in the second state following operation of the motor vehicle.

The terms deform and deformable used within the specification are intended to encompass any process by which the retaining member or a portion of the retaining member changes its shape or form. For example, deforming may include, melting, subliming, breaking, e.g. fracturing or shattering, decomposing, e.g. thermally decomposing, oxidizing, plastically deforming or any other type of deformation.

The fastener assembly may be for use in an engine assembly of the motor vehicle. The first component may be a component of the engine. The first component operating environment may correspond to an engine operating environment.

The fastener assembly may be used on an engine, transmission, or another component of the powertrain or the exhaust system of the motor vehicle, including the exhaust after-treatment systems.

The deformable portion may have a melting point less than or equal an operating temperature of the first component. For example, the deformable portion may have a melting temperature lower than 70 degrees Celsius or lower than 60 degrees Celsius.

The deformable portion may be made from a polymer material, such as polycaprolactone. Alternatively, the deformable portion may be made from a wax material. The retaining member may consist of the deformable portion.

The retaining member may be configured to at least partially melt during operation of the motor vehicle. For example, the deformable portion may be configured to at least partially melt. The deformable portion may be configured such that substantially all of the deformable portion melts during operation of the motor vehicle, e.g. the engine assembly of the motor vehicle.

The retaining member may be configured such that at least a portion of the retaining member, e.g. the deformable portion or at least part of the deformable portion, evaporates during operation of the motor vehicle.

The retaining member may be configured to vibrate during operation of the motor vehicle. The retaining member may be configured such that a natural frequency of vibration of the retaining member may be substantially equal to an operating frequency of the motor vehicle. For example, a natural frequency of vibration of the retaining member may be substantially equal to an engine running speed of the engine assembly of the motor vehicle. Alternatively, the natural frequency of the retaining member may be a multiple or fraction of the engine running speed.

The retaining member may be configured such that the natural frequency of the retaining member varies according to the temperature of the retaining member. For example, the retaining member may be configured such that that a natural frequency of vibration of the retaining member may be substantially equal to an operating frequency of the motor vehicle at the operating temperature of the first component.

The retaining member may be configured to fracture into a plurality of fragments during operation of the engine assembly. For example, the deformable portion may fracture or the retaining member may fracture such that the deformable portion becomes detached from a remaining portion of the retaining member.

The retaining member may be configured to be at least partially received within the bore. The bore and/or the retaining member may be configured such that the retaining member forms an interference fit with the bore.

The fastener shank may comprise a mid-portion and a distal portion. The mid-portion may have a smaller diameter than the distal portion. The mid-portion and the distal portion may be separated by a shoulder. The retaining member may act against the shoulder in order to provide resistance against the removal of the fastener.

The retaining member may be couplable to the fastener by inserting the shank of the fastener through the opening such that the retaining member engages the shoulder of the fastener shank.

The retaining member may comprise one or more resilient grip elements. The resilient grip elements may be configured to deform in order to allow the fastener to be inserted through the opening. The resilient grip elements may be configured to grip the fastener to couple the fastener to the retaining member. The resilient grip elements may engage the central portion and/or the shoulder of the fastener shank.

The fastener may be a single-use fastener. The fastener may be configured such that stresses within the fastener are substantially equal to or exceed the yield stress of the material of the fastener, when the first and second components are coupled together.

The first component may comprise a drain channel. The drain channel may be configured to allow a melted portion of the retaining member to drain away from the bore. The drain channel may comprise an opening, e.g. through the first component, allowing the melted portion of the retaining member to drain out of and/or away from the first component.

Alternatively, the first component may comprise a chamber. The chamber may be configured such that the melted portion of the retaining member is received within the chamber. The melted portion may be retained within the chamber, e.g. during future operation of the motor vehicle.

According to another aspect of the present disclosure, there is provided a fastener assembly for a motor vehicle, the fastener assembly comprising: a fastener configured to couple a first component to a second component of the motor vehicle, the fastener comprising a shank configured to be received within a bore of the first component; and a retaining member, the retaining member being couplable to the fastener and the first component, the retaining member comprising an opening configured to receive the fastener shank and to provide a resistance against the removal of the fastener shank from the bore of the first component, wherein the retaining member comprises a deformable portion configured to deform from a first state to a second state by virtue of the operating environment to which the fastener is subjected, such that the fastener may be removed from the bore of the first component when the deformable portion is in the second state.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF DESCRIPTION OF THE DRAWINGS

For a better understanding of the present disclosure, and to show more clearly how it may be carried into effect, reference will now be made, by way of example, to the accompanying drawings. The figures are drawn to scale, although other relative dimensions may be used, if desired.

DETAILED DESCRIPTION

Figure 1:
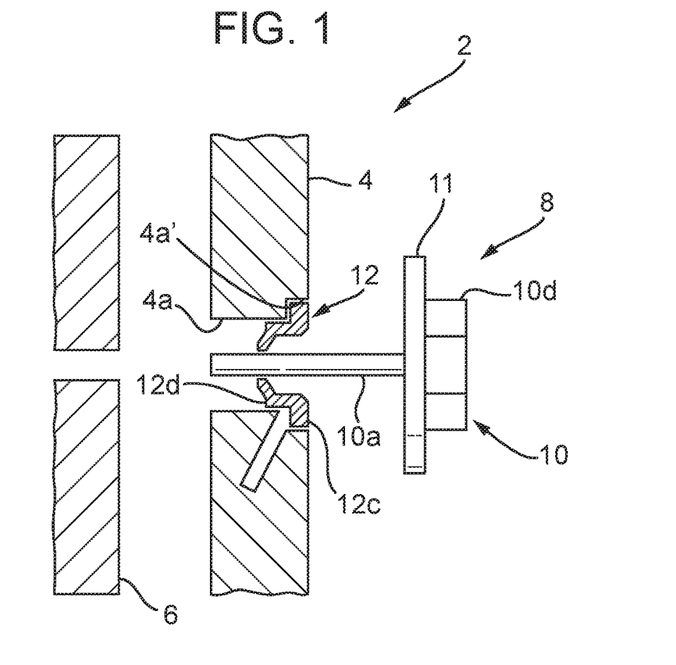
FIG. 1 is a partial sectional view of an engine assembly, according to an arrangement of the present disclosure, prior to assembly of the engine assembly.

With reference to FIG. 1, an engine assembly 2 for a motor vehicle, according to an arrangement of the present disclosure, comprises a first component 4 and a second component 6. In the arrangement shown in FIG. 1, the first component 4 comprises a cylinder head and the second component 6 comprises a cylinder block. However, it is equally envisaged that the first and second components may comprise any components or subassemblies of an engine assembly that are configured to be coupled together using one or more fasteners.

The engine assembly 2 may further comprise a fastener assembly 8, comprising a fastener 10 and a retaining member 12. The fastener 10 may comprise an elongate shank 10a and a head 10d. As shown in FIG. 1 the head 10d may comprise a washer 11 integral with the head 10d. However, in other arrangements, such as the arrangement depicted in FIG. 6, the washer 11 may be a separate component.

As shown in FIG. 1, prior to assembly of the engine assembly 2, the fastener 10, e.g. shank 10a of the fastener, may be provided within a bore 4a of the first component 4 and the retaining member 12 may be configured to provide a resistance against the removal of the shank 10a from the bore 4a.

In the arrangement shown in FIG. 1, the retaining member 12 is coupled to the first component 4, e.g. fixed axially relative to the first component 4. The retaining member 12 may be at least partially received within the bore 4a of the first component 4. The retaining member 12 may form an interference fit with the bore 4a. For example, a body portion 12d of the retaining member 12 may form an interference fit with the bore 4a. The body portion 12d may be substantially annular. A rim portion 12c of the retaining member 12 may extend radially outward from the body portion.

As depicted in FIG. 1, the bore may comprise a counterbore 4a'. The rim portion 12c of the retaining member may be received within the counterbore 4a'. In some arrangements, the rim portion 12c may form an interference with the counterbore. In such arrangements, the body portion 12d may also form an interference fit with the bore 4a or the body portion 12d may form a clearance fit with the bore 4a.

As shown in FIG. 1, the fastener 10 may be axially movable relative to the retaining member 12. The retaining member may be configured to act against the fastener 10 to resist the removal of the shank 10a from the bore 4a.

Figure 2:
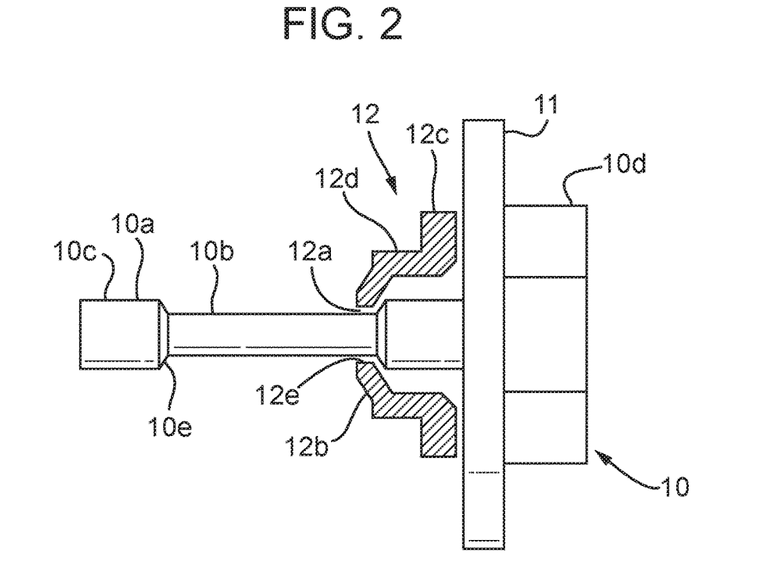
FIG. 2 is a partial sectional view of a fastener assembly, according to arrangements of the present disclosure.

With reference to FIG. 2, the retaining member 12 may comprise an opening 12a configured to receive the shank 10a of the fastener. The retaining member 12 may further comprise one or more grip members 12b. The grip members 12b may extend radially inwards from the body portion 12d of the retaining member 12 towards the opening 12a. As shown in FIG. 2, the grip members 12b may extend in a direction comprising a component in a direction of a central axis of the fastener shank 10a. Grip surfaces 12e may be provided at distal ends of each of the grip members 12b. The grip surfaces 12e may at least partially define the opening 12a.

Figure 3A:
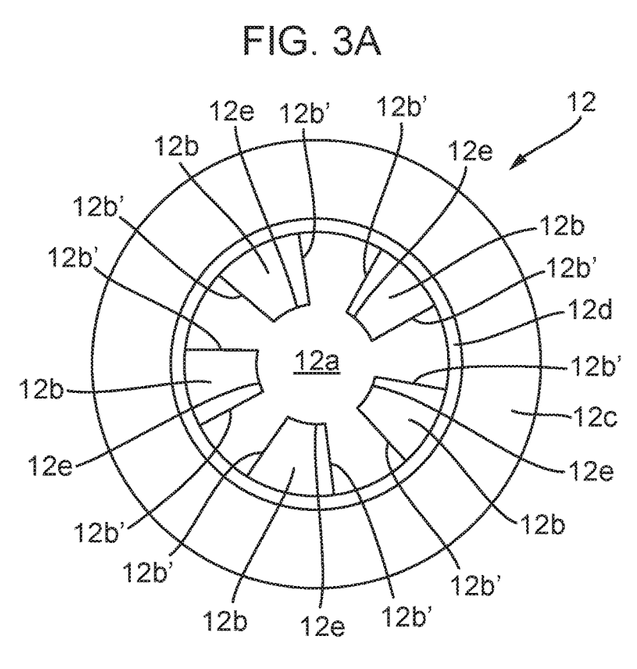
FIGS. 3A and 3B are end views of retaining members according to arrangements of the present disclosure.

With reference to FIG. 3A, in some arrangements, the retaining member 12 may comprise a plurality of grip members 12b arranged circumferentially about the body portion 10d. The grip members 12b may be separated by gaps between the body portion 12d and the opening 12a in which no grip member is provided. As shown in FIG. 3A, sidewalls 12b' of the grip portions may extend in a substantially radial direction of the retaining member 12. The grip members 12b may be resilient. When the shank 10a of the fastener is inserted into the opening 12a, the grip members 12b may be deflected in order to allow the fastener 10 to be received within the opening 12a.

Figure 3B:
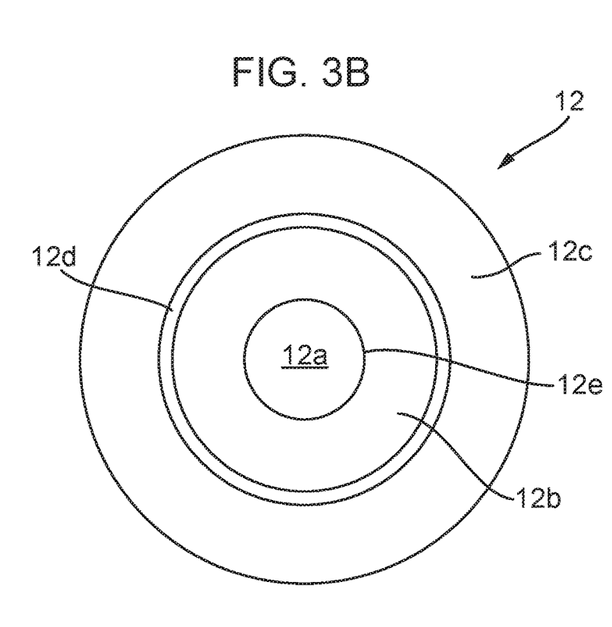

In the arrangements shown in FIG. 3B, a single grip member 12b is provided. The single grip member extends around, e.g. completely around, the circumference of the body part 12d. The grip member 12b forms a resilient ring that may be deformed in order to allow the shank 10a to be inserted into the opening 12a of the retaining member 12.

Following installation of the shank 10a into the opening 12a, the grip members 12b may grip the fastener 10, e.g. at the grip surfaces 12e, to provide a resistance against its removal. The resistance may be at least partially due to friction between the grip surfaces 12e and the shank 10a.

With reference to FIG. 2, a central portion 10b of the shank 10a may have a smaller diameter than a distal portion 10c of the shank. The central and distal portions 10b, 10c of the shank 10a may be separated by a shoulder or lip 10e. As described above, the grip members 12b may be deformed in order to allow the shank to be received within the opening 12a. Once the distal portion 10c of the shank has been received within the opening 12a, e.g. such that the grip members 12b are aligned with the central portion 10b of the shank 10a, the grip members 12a may spring back inwardly, due to their resilient nature, and the grip surfaces 12e may contact the central portion 10b of the shank 10a. The grip members 12b may be positioned to act against the shoulder 10e to resist the removal of the fastener 10 from the bore 4a. The fastener 10 may otherwise be movable, e.g. axially movable, relative to the retaining member 12, e.g. such that the grip members 12b remain aligned with the central portion 10b of the shank 10a.

In another arrangement (not shown) the retaining member 12 may be coupled to the fastener 10, e.g. fixed axially relative to the fastener 10. The fastener 10 and the retaining member 12 may be axially movable relative to the first component 4 and the retaining member 12 may act against the first component 4 to resist the removal of the shank 10a from the bore 4a.

Figure 4:
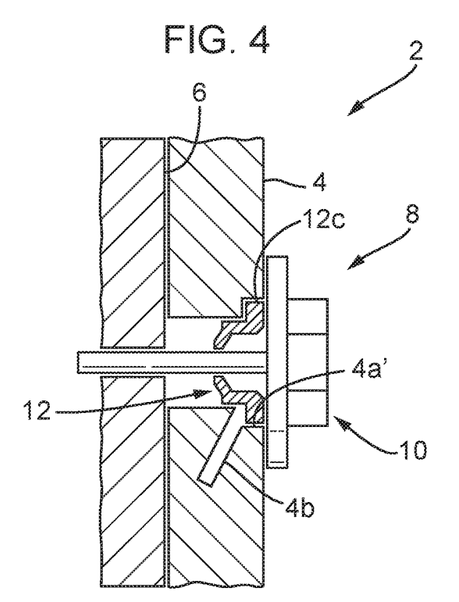
FIG. 4 is a partial sectional view of the engine assembly following assembly.

When the first component 4 is coupled to second component 6, as shown in FIG. 4, the fastener 10 may initially be tightened until a tightening torque applied to the fastener reaches a desired level. The fastener 10 may then be tightened further by turning the fastener through a desired angle. Tightening the fastener 10 in this way may allow the tensile stress in the fastener to be increased to a consistent and repeatable level, such that the fastener applies a desirable clamping force between the first and second components 4, 6. The fastener 10 may be a single use fastener and the level of tensile stress in the fastener may be greater than or equal to a yield strength of the material of the fastener 10. It may be undesirable for the fastener to be exposed to such tensile stresses more than once, and hence, if it is desirable to disassemble the first component 4 from the second components 6, it may be desirable to replace the fastener 10 before reassembling the engine assembly 2.

As shown in FIG. 4, the retaining member 12 may be configured such that it is unaffected by the coupling of the first component 4 to the second component 6 using the fastener 10. For example, as shown in FIG. 4, the rim portion 12c of the retaining member 12, the counterbore 4a' and/or the second component 6 may be configured such that a load path provided between the first and second components 4, 6 does not act through the retaining member 12. Additionally, the grip members 12b and/or the shank 10a may be configured such that the fastener 10 may be rotated without disrupting the grip members 12b or other portions of the retaining member. As the retaining member 12 is unaffected by the coupling of the first and second components 4, 6, the fastener 10 may remain captive within the bore 4a of the first component 4 following disassembly of the engine assembly 2.

In order to allow the fastener 10 to be replaced, the retaining member 12 may be configured such that during operation of the motor vehicle, e.g. during operation of the engine assembly 2, the configuration of the retaining member 12 changes such that the resistance provided by the retaining member 12 against the removal of the shank 10a from the bore 4a is reduced. As described below, at least a portion, e.g. a deformable portion, of the retaining member 12 may be configured such that its shape, form and/or material phase changes during operation of the engine assembly. Additionally or alternatively, the retaining member 12 may be configured such that the material of at least a portion of the retaining member undergoes a chemical reaction during operation of the engine assembly 2.

In some arrangements, the retaining member 12 may consist of the deformable portion, e.g. substantially all of the retaining member 12 may be deformable. Alternatively, the deformable portion of the retaining member 12 may correspond to the grip members 12b, the body portion 12d, and/or the rim portion 12c. Alternatively again, the deformable portion may comprise a sector or segment of the retaining member 12.

Figure 5:
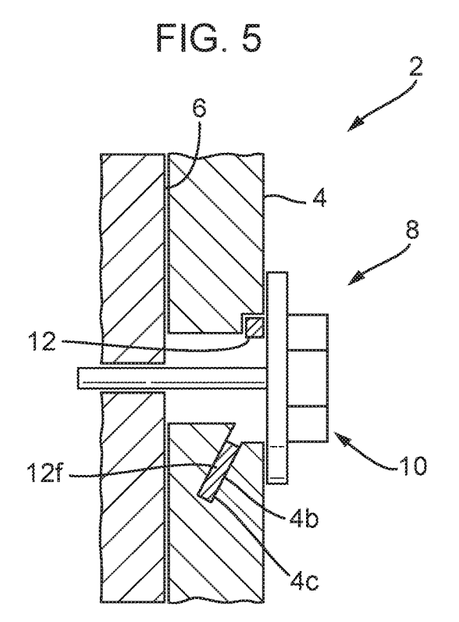
FIG. 5 is a partial sectional view of the engine assembly following operation of the engine assembly.

With reference to FIG. 5, the retaining member 12, may be made from a material having a low melting point, e.g. lower than or equal to an operating temperature of the first component 4 or engine assembly 2. The retaining member 12 may be made from a material having a melting temperature lower than 70 degrees Celsius or lower than 60 degrees Celsius. For example, the retaining member 12 may be made from a polymer material, such as polycaprolactone. Alternatively, the retaining member 12 may be made from a wax material. The retaining member 12 may therefore be configured to deform during operation of the motor vehicle as the engine assembly 2, e.g. the first component 4, approaches the melting point of the retaining member 12. Once the retaining member 12 has deformed, the retaining member 12 may no longer act against the fastener and/or first component 4 to resist removal of the shank 10a from the bore 4a of the first component.

In the arrangement depicted, substantially all of the retaining member 12 is made from the low melting temperature material. However, it is equally envisaged that, in some arrangements, a portion, e.g. the deformable portion, of the retaining member 12 may be made from the low melting temperature material and a remaining portion of the retaining member 12 may be made from any other desirable material, such as a higher melting temperature polymer material or a metal material.

If the engine assembly 2 continues operating at a temperature greater than the melting point of the retaining member for a period of time, e.g. such that the first component 4 reaches the temperature equal to or greater than the melting point, the retaining member 12 may at least partially melt. As show in FIG. 5, the first component 4 may comprise a drain channel 4b configured to allow a melted portion 12f of the retaining member 12 to drain away from the bore 4a, such that the retaining member no longer acts against the removal of the fastener 10 from the bore 4a. As depicted, the drain channel 4b may be provided at the bottom, e.g. the lowest point, of the bore 4a, such that the melted portion flows towards the drain channel 4b under the action of gravity.

In the arrangement shown in FIG. 5, the drain channel 4b forms a chamber 4c configured to receive the melted portion 12f of the retaining member, such that the melted portion 12f is retained within the first component 4. The volume of the chamber 4c may be sufficient to contain the melted portion 12f. It is also envisaged that, in other arrangements, the drain channel 4b may comprise an opening (not shown) at an end of the drain channel. The opening may be provided through the first component 4 and may be configured to allow the melted portion 12f to drain out of or away from the first component 4.

Providing the drain channel 4b to allow the melted portion to drain away may prevent the melted portion burning on to and/or staining the first component 4. Additionally or alternatively, allowing the melted portion to drain away from the first component into the drain channel 4b may prevent the melted portion contaminating other components of the engine. For example, providing the drain channel may prevent the melted portion draining into and/or contaminating an oil system of the engine.

In some arrangements, a temperature at which the material of the retaining member 12, or a portion of the retaining member, thermally decomposes may be less than or equal to an operating temperature of the engine assembly 2. Hence, the retaining member 12 may at least partially thermally decompose during operation of the engine assembly 2. The retaining member 12 may thermally decompose into gaseous elements and/or compounds, which may disperse away from the bore 4a.

Additionally or alternatively, in some arrangements, a boiling or sublimation point of the material from which the retaining member 12, or a portion of the retaining member 12, is made may be sufficiently low that at least a portion of the retaining member 12 may evaporate during operation of the engine assembly 2. The retaining member 12 may therefore no longer act to resist removal of the shank 10a from the bore 4a following operation of the engine assembly 2.

In another arrangement, the retaining member 12 may be configured to vibrate during operation of the engine assembly 2. The retaining member 12 may be configured such that a natural frequency of vibration of the retaining member is substantially equal to an operating frequency of the motor vehicle, e.g. a running speed of the engine, such as an idle speed of the engine. For example, the length and/or thickness of the grip members 12b and/or the stiffness of the material of the retaining member 12 may be configured in order to achieve a desired natural frequency of vibration. The natural frequency of vibration of the retaining member may vary according to the temperature of the retaining member. In some arrangements, the retaining member 12 may be configured such that the natural frequency of the retaining member 12 is substantially equal to the running frequency of the engine at the operating temperature of the engine. The magnitude of vibration of the retaining member during operation of the engine assembly 2 may therefore be large.

In some arrangements, the retaining member 12, or the deformable portion of the retaining member, may be made from a brittle material such that vibration of the retaining member causes at least a portion of the retaining member to fracture. The retaining member 12 may be configured to fracture into a plurality of fragments during operation of the engine assembly 12. Alternatively, the retaining member may be configured such that the deformable portion of the retaining member 12 breaks away from a remaining portion of the retaining member.

Following fracture of the retaining member 12, the resistance provided by the retaining member 12 against the removal of the shank 10a of the fastener 10 from the bore 4a of the first component 4 may be reduced. For example, fracture of the retaining member 12 may occur at or near one or more of the grip members 12b. The friction force between the grip surfaces 12e and the shank 4a may therefore be reduced. Additionally or alternatively, a fractured grip member 12b may not act against the shoulder 4d to resist removal of the shank 10a from the bore 4a.

In some arrangements, the retaining member 12 may be configured such that vibration of the retaining member 12 leads to the material of the retaining member being work hardened. Work hardening may occur due to the vibration of the engine assembly 2 repeatedly applying a strain to the retaining member 12. Work hardening may cause the material of the retaining member to become brittle. Hence, the retaining member may be more liable to fracture as the length of time over which the engine assembly 2 is operated increases.

Configuring the retaining member 12 such that it becomes brittle during operation of the engine assembly 2 may allow the retaining member 12 to be sufficiently tough prior to assembly of the of the engine assembly 2 to suitably resist the removal of the fastener 10 from the bore 4a.

In some arrangements, vibration of the retaining member 12 during operation of the engine assembly may not itself cause the retaining member to fracture. However, the work hardening of the retaining member during the operation of the engine assembly may cause the retaining member 12 to fracture when an attempt is made to remove the fastener 10 from the bore 4a, such that the retaining member 12 no longer acts to resist removal of the fastener.

Figure 6:
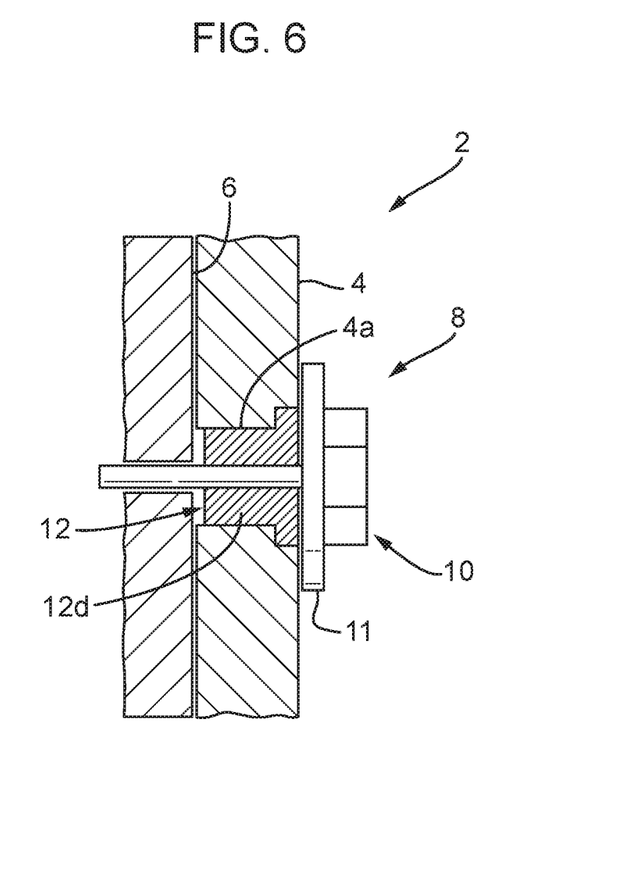
FIG. 6 is a partial sectional view of an engine assembly, according to another arrangement of the present disclosure.

With reference to FIG. 6, in some arrangements, the retaining member 12 may not comprise the grip members 12b. In such arrangements, the body portion 12d of the retaining member 12 may form the opening 12a and/or may be configured to form an engineering fit, e.g. an interference fit, with the fastener 10. The retaining member 12 may thereby resist removal of the fastener 10 from the opening 12a due to friction resulting from the fit between the fastener shank 10a and the body portion 12d. The engineering fit formed between the fastener 10 and the retaining member 12 may be configured to allow the fastener 10 to be rotated, such that the first component 4 may be coupled to the second component 6, without affecting the ability of the retaining member to resist removal of the fastener 10 from the bore 4a.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the disclosure has been described by way of example, with reference to one or more exemplary examples, it is not limited to the disclosed examples and that alternative examples could be constructed without departing from the scope of the disclosure as defined by the appended claims.

The invention claimed is:

1. A motor vehicle assembly comprising:
a first component;
a second component; and
a fastener assembly, the fastener assembly comprising:
  a fastener configured to couple the first component to the second component, the fastener comprising a shank configured to be received within a bore of the first component; and
  a retaining member, the retaining member being couplable to the fastener and the first component, the retaining member comprising an opening configured to receive the fastener shank and to provide a resistance against the removal of the fastener shank from the bore of the first component, wherein the retaining member comprises a deformable portion configured to deform from a first state to a second state by virtue of the operating environment of the first component such that the fastener is removable from the bore of the first component when the deformable portion is in the second state following operation of the motor vehicle assembly,
  wherein the deformable portion is made from a wax material,
  and/or the retaining member is configured to at least partially melt during operation of the motor vehicle assembly,
  and/or the retaining member is configured such that at least a portion of the retaining member evaporates during operation of the motor vehicle assembly,
  and/or the retaining member is configured to vibrate during operation of the motor vehicle assembly,
  and/or the retaining member is configured to fracture into a plurality of fragments during operation of the motor vehicle assembly.

2. The motor vehicle assembly of claim 1, wherein the deformable portion has a melting point less than or equal to an operating temperature of the first component such that at least a portion of the deformable portion melts during operation of the motor vehicle assembly comprising the first component.

3. The motor vehicle assembly of claim 1, wherein the deformable portion is made from a polymer material.

4. The motor vehicle assembly of claim 1, wherein the retaining member consists of the deformable portion.

5. The motor vehicle assembly of claim 1, wherein the retaining member is configured such that a natural frequency of vibration of the retaining member is substantially equal to an operating frequency of the motor vehicle assembly.

6. The motor vehicle assembly of claim 5, wherein the retaining member is configured such that the natural frequency of the retaining member varies according to the temperature of the retaining member.

7. The motor vehicle assembly of claim 1, wherein the retaining member is configured to be at least partially received within the bore.

8. The motor vehicle assembly of claim 7, wherein the bore and/or the retaining member is configured such that the retaining member forms an interference fit with the bore.

9. The motor vehicle assembly of claim 1, wherein the fastener shank comprises a mid portion and a distal portion, the mid portion having a smaller diameter than the distal portion, the mid portion and the distal portion being separated by a shoulder;
  wherein the retaining member acts against the shoulder in order to provide resistance against the removal of the fastener.

10. The motor vehicle assembly of claim 9, wherein the retaining member is couplable to the fastener by inserting the shank of the fastener through the opening such that the retaining member engages the shoulder of the fastener shank.

11. The motor vehicle assembly of claim 1, wherein the retaining member comprises one or more resilient grip elements configured to deform in order to allow the fastener to be inserted through the opening, the resilient grip elements configured to grip the fastener to couple the fastener to the retaining member.

12. The motor vehicle assembly of claim 1, wherein the fastener is a single use fastener.

13. The motor vehicle assembly of claim 1, wherein the first component comprises a drain channel, the drain channel being configured to allow a melted portion of the retaining member to drain away from the bore.

14. The motor vehicle assembly of claim 1, wherein the first component comprises a chamber, the chamber being configured such that a melted portion of the retaining member is received within the chamber.

15. A fastener assembly for a motor vehicle, the fastener assembly comprising:
- a fastener configured to couple a first component to a second component of the motor vehicle, the fastener comprising a shank configured to be received within a bore of the first component; and
- a retaining member, the retaining member being couplable to the fastener and the first component, the retaining member comprising an opening configured to receive the fastener shank and to provide a resistance against the removal of the fastener shank from the bore of the first component, wherein the retaining member comprises a deformable portion configured to deform from a first state to a second state by virtue of the operating environment to which the fastener is subjected, such that the fastener is removable from the bore of the first component when the deformable portion is in the second state, wherein deformation from the first state to the second state comprises at least a portion of the retaining member decomposing, dispersing, and/or breaking away during operation of the motor vehicle such that resistance provided by the retaining member against removal of the shank is reduced.

16. The fastener assembly of claim 15, wherein the deformable portion is made from a wax material.

17. The fastener assembly of claim 15, wherein the retaining member is configured such that at least a portion of the retaining member evaporates during operation of the motor vehicle assembly.

18. The fastener assembly of claim 15, wherein the retaining member is configured to vibrate during operation of the motor vehicle assembly.

19. A method, comprising:
- operating a vehicle with a fastener assembly comprising fastener coupling components and comprising a shank received within a bore of a first component, and a retaining member couplable to the fastener and the first component and comprising an opening receiving the shank, the retaining member having a deformable portion deformed by the vehicle operation such that the fastener is removable from the bore, wherein deformation of the deformable portion comprises at least a portion of the retaining member decomposing, dispersing, and/or breaking away during operation of the vehicle such that resistance provided by the retaining member against removal of the shank is reduced.

20. The method of claim 19, wherein the retaining member is configured to at least partially melt during operation of the motor vehicle assembly.

21. The method of claim 19, wherein the retaining member is configured to fracture into a plurality of fragments during operation of the motor vehicle assembly.

* * * * *